(No Model.)

D. H. FERGUSON.
MACHINE FOR MOLDING PULP.

No. 444,916. Patented Jan. 20, 1891.

Witnesses
Wm. P. McKeat
Fred J. Sears

Inventor
David Hislop Ferguson
By his Attorney

UNITED STATES PATENT OFFICE.

DAVID HISLOP FERGUSON, OF MONTREAL, CANADA.

MACHINE FOR MOLDING PULP.

SPECIFICATION forming part of Letters Patent No. 444,916, dated January 20, 1891.

Application filed July 5, 1889. Serial No. 316,626. (No model.)

*To all whom it may concern:*

Be it known that I, DAVID HISLOP FERGUSON, of the city of Montreal, in the District of Montreal and Province of Quebec, Canada, have invented certain new and useful Improvements in Machines for Molding Pulp; and I do hereby declare that the following is a full, clear, and exact description of the same.

This invention is an apparatus for molding articles of paper-pulp and like material, and has for its object a simple construction of apparatus which shall provide the necessary drainage, compression from above, below, and laterally, so as to give an even pressure to all parts of the mass in the formation of the article.

The invention consists of an endless mold of flexible non-elastic material adapted in the operation of the machine to receive lateral pressure to reduce the diameter without reducing the working-surface of the mold.

Further, it consists in an endless mold of flexible material provided with a series of external ribs, a suitable former, a bottom for the mold, and means for imparting lateral pressure to said mold for reducing its diameter.

Further, the invention consists in a former with a hydraulic plunger for imparting movement thereto and a mold with a hydraulic plunger for giving pressure to said mold, the pressure of one of said plungers exceeding that of the other, whereby movement is imparted to the part having the least power, while at the same time the blank being molded is under constant pressure from the two plungers.

For full comprehension, however, of the invention, reference must be had to the annexed drawings, in which—

Figure 1:
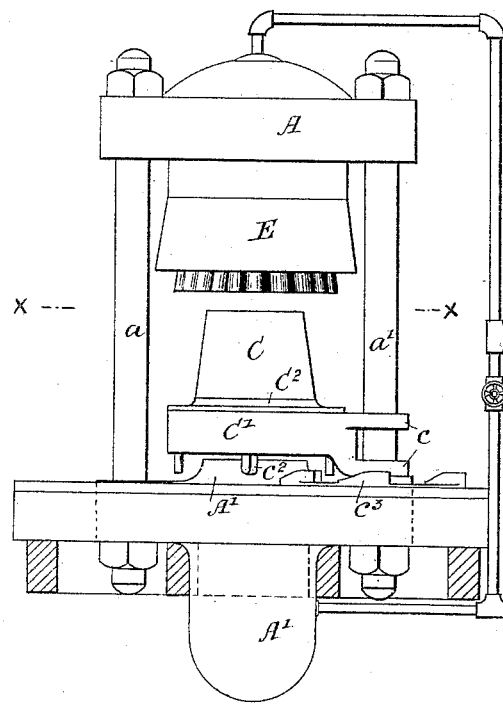
Figure 2:
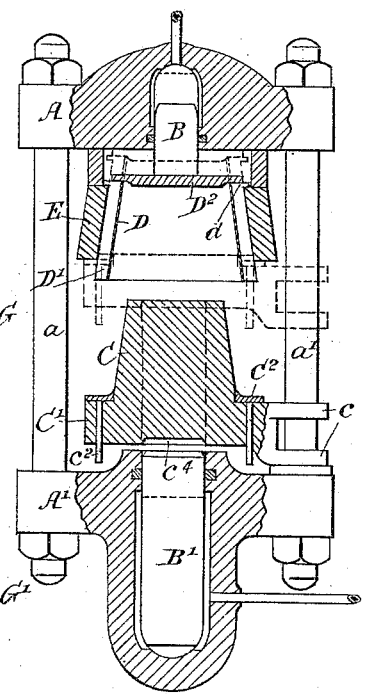
Figure 3:
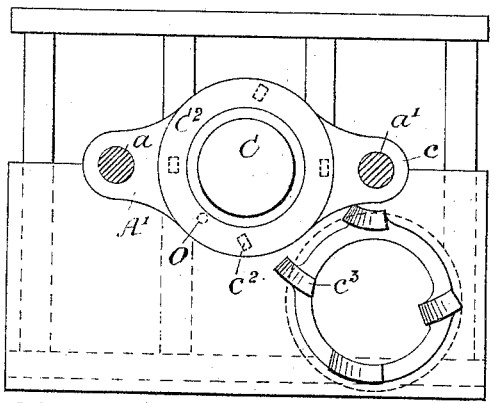
Figure 4:
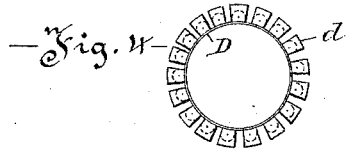

Figure 1 is a front elevation of the apparatus; Fig. 2, a vertical sectional elevation of same; Fig. 3, a horizontal section taken on line X X, Fig. 1; Fig. 4, a view of the top of the mold; and Fig. 5, a section of the mold, showing one half in its normal state and the shape of another half when under pressure.

Similar letters of reference indicate like parts.

A A' are top and bottom blocks chambered to contain the hydraulic plungers B B', the lower plunger being of larger size and arranged to exert greater pressure than the upper. The blocks are connected by the bars $a$ $a'$ and the whole structure carried on any suitable frame-work.

C is the former, having the shape of the interior of the article to be operated upon, which, by means of eyes in projections $c$, from its extended base C', is pivoted to the bar $a'$, so as to slide vertically thereon and swing horizontally.

$C^2$ is a ring encircling the former at and resting upon the upper side of its base and having pins $c^2$ projecting downward through slots in same, which, when the former is swung outward to the dotted position shown in Fig. 3, engage with the inclines $c^3$ on the table part of the frame, and thus elevate the ring to free the article from the former. A recess $c^4$ is formed in the bottom of the base, which the head of the plunger B' can fit and hold it in line when rising.

The mold is formed of a metal band D, preferably steel, forming the sides and carrying on its outside vertical ribs or bars D', provided at their upper ends with outwardly-projecting lips $d$. $D^2$ is the top plate, which rests on the top of the mold.

E is the cone-shaped sleeve hung from the block A, which supports the mold in its normal position by means of the lips $d$ resting on its upper edge. The plunger B bears on the top plate $D^2$ of the mold; and it will be seen that this top plate, the sleeve E, and its connections must be strong enough to resist the pressure they will be called upon to bear.

G is the inlet and G' the outlet for the water required to work the plunger, $g'$ $g^2$ $g^3$ being the controlling-valves.

In the operation of the machine when blanks are being made the mold is closed by elevating the former until the ring $C^2$ is in contact with the bottom of the mold, and the fluid pulp is pumped into the space between it and the former in the usual manner through a channel O (indicated by dotted lines, Fig. 3,) in the base of the former communicating with such space, and a further elevation of the former serves to secure the desired pressure, as will now be explained.

Figure 5:
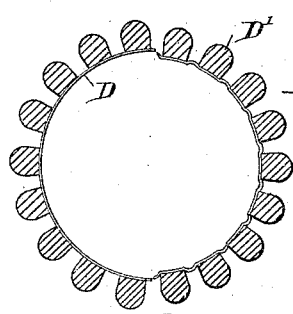

As before mentioned, the plunger B' is more powerful than plunger B, and the latter can obviously oppose only a yielding resistance to its upward pressure, the result being that the mold by contact with the former is forced upward in the conical sleeve E, which, by its shape, forces the bars D' to converge, thus causing the band D to corrugate between them, as shown in the right-hand half of Fig. 5, and securing the necessary compression of the pulp at all points.

In elevating the plunger B', as just mentioned, the valve $g^3$ is closed and $g'$ $g^2$ opened, and all the parts are allowed to assume their normal position by closing valve $g^2$ and opening $g^3$, thus removing pressure from plunger B' and continuing that of B till the mold is returned to its normal position.

When the former C has reached its resting-point, it is swung out and the finished article removed.

To finish the article after being formed in either of the ways herein described, a block and mold without drainage-perforations and polished is used and the blank subjected to a greater pressure than before, no alteration in the operation of the machine being required.

By making my improved mold continuous and of flexible metal I am enabled to apply lateral pressure very simply and without difficulty to the fibrous mass being molded and directly to the periphery of the mold, this pressure being preferably applied by ribs, which tend to corrugate the metal of the mold and thus force it inwardly, reducing its diameter, while between the ribs the excess of moisture may escape, and at the same time the working interior surface of the mold is undiminished. This construction of mold obviates the difficulty now existing in that class of machines where the molds are formed with overlapping ends and require circumferential movement to give the lateral pressure, as in such molds the fibrous material passes through the interstices of the mold, and the effect is a dragging one upon the fibrous material, impairing the surface of the article.

What I claim is as follows:

1. In combination, in a machine for molding articles from pulp, an endless flexible non-elastic mold with means for reducing its diameter under lateral pressure, substantially as described.

2. In combination with a flexible non-elastic mold, a series of external ribs, and means for applying lateral pressure to said ribs, substantially as described.

3. In combination with a former and molds and pressure devices for each, the pressure being of different degrees, whereby one of the parts yields to the force of the other, while at the same time the blank is under pressure of both, substantially as described.

4. In combination, a movable former, a flexible metal mold, a stationary cone-shaped ring, and ribs between the mold and the ring, the movement of the mold vertically reducing its diameter and applying lateral pressure to the article, substantially as described.

D. H. FERGUSON.

Witnesses:
WM. P. MCFEAT,
FRED. J. SEARS.